United States Patent [19]

Heller

[11] Patent Number: 4,713,824
[45] Date of Patent: Dec. 15, 1987

[54] NOBLE-METAL OVERCOATED, FRONT-SURFACE SILVER REFLECTORS

[75] Inventor: Donald F. Heller, Bound Brook, N.J.

[73] Assignee: Allied Corporation, Morris Township, Morris County, N.J.

[21] Appl. No.: 465,734

[22] Filed: Feb. 11, 1983

[51] Int. Cl.$^4$ ................................................ H01S 3/08
[52] U.S. Cl. ..................................................... 372/99
[58] Field of Search ................... 372/99; 350/299, 300

[56] References Cited

U.S. PATENT DOCUMENTS

| Re. 31,057 | 10/1982 | Morris et al. | 372/41 |
| 33,721 | 11/1861 | Hebig . | |
| 3,609,589 | 9/1971 | Hufnagel | 331/94.5 |
| 4,272,733 | 6/1981 | Walling et al. | 331/94.5 |

OTHER PUBLICATIONS

G. Hass, in Applied Optics and Optical Engineering, R. Kingslake, ed. (Academic, New York, 1965) vol. III, pp. 309–330.

Primary Examiner—William L. Sikes
Assistant Examiner—Robert E. Wise
Attorney, Agent, or Firm—Anibal Jose Cortina; Gerhard H. Fuchs

[57] ABSTRACT

A partially-transparent, noble-metal protective overcoat is provided to a front-surface silver reflector. The overcoat, preferably of gold, may be applied by vacuum-deposition or electrodeposition. Optimum overcoat thickness is the minimum required to protect the reflector in the environment of its intended use. The overcoated reflector of this invention is particularly well suited for the surface of a laser pump cavity.

8 Claims, 2 Drawing Figures

NOBLE-METAL OVERCOATED, FRONT-SURFACE SILVER REFLECTORS

BACKGROUND OF THE INVENTION

1. Field of the Invention

This invention relates to a transparent protective overcoat for a front-surface silver reflector. More particularly, the invention relates to a noble-metal overcoat and processes for its preparation.

2. Description of the Prior Art

Coating glass with silver to form a mirror is not new. However, since silver that is exposed to the atmosphere rapidly tarnishes due to chemical attack, it is necessary either to provide a protective coating over the silver or to otherwise prevent its being exposed to the atmosphere. Consequently, silver is used almost exclusively as a "back-surface" coating (for reflecting light that has passed through a transparent substrate), rather than as a "front-surface" coating. Even back-surface silver coatings require a protective overcoat. Protective coatings of metals, including gold, over back-surface silver coatings on mirrors were disclosed in U.S. Pat. No. 33,721, which issued Nov. 12, 1861, to J. von Liebig.

Front-surface silver mirrors have been prepared with protective layers of transparent dielectrics, such as MgF$_2$ or oxides of aluminum and silicon. (See, e.g., G. Hass, J. Opt. Soc. Am. 72, 27 (1982)). Although these protective layers can actually enhance the reflectivity of silver, they have a tendency to degrade at high power levels of optical or other radiation and are subject to chemical attack, particularly at elevated temperatures. These limitations are particularly troublesome in laser applications, such as reflective coatings on the pump cavity walls of optically pumped lasers.

SUMMARY OF THE INVENTION

In accordance with the present invention, there is provided a reflector that includes a substrate having a reflective-silver coating on its front surface, wherein the improvement comprises a partially-transparent noble-metal overcoat. Preferably, the overcoat is gold and is prepared by electrodepositing or vacuum-depositing the gold onto a front-surface reflective-silver coating. A particularly useful embodiment of the invention is in a laser comprising a laser medium, pump means for exciting the laser medium to emit coherent radiation, and a pump cavity to enclose the laser medium and pump medium, an inner surface of the pump cavity having a reflective-silver coating. The improvement comprises a partially-transparent noble-metal overcoat on the reflective-silver coating.

DETAILED DESCRIPTION OF THE INVENTION

This invention provides a noble-metal protective overcoat for front-surface silver reflectors. Although iridium, platinum, and other noble metals may be used for the protective coating, gold is preferred, because it is more ductile and less expensive than the others. The overcoat thickness involves a compromise between minimizing optical absorption and, nevertheless, providing adequate protection. Thus, overcoat thicknesses in the range between about 1 nm and 1,000 nm are preferred.

Figure 1:
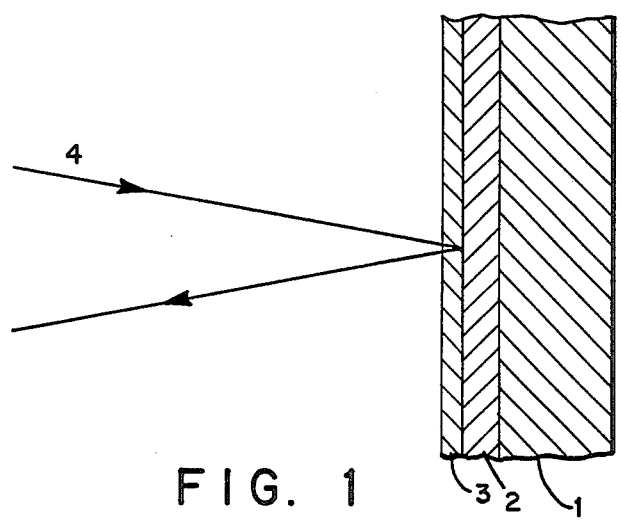
FIG. 1 is a cross section of a reflector of the present invention in operation.

FIG. 1 depicts a schematic of the present invention in cross section. It shows the substrate 1, which has a reflective-silver coating 2 on its front surface, and partially-transparent noble-metal overcoat 3. Incident beam 4 is reflected from the surface of silver coating 2, after passing through overcoat 3.

An advantage of the protective coating of the present invention is that the overcoat can be made to alloy with, and thereby adhere very well to, the reflective silver. In practice, the noble metal, such as gold, is first vacuum-deposited or electrodeposited onto the silver. Electrodeposition is preferred, because it provides better bonding of the gold, is less expensive, and is easier to control. The subsequent alloying of the gold and silver can be enhanced by annealing the overcoated silver coating.

Noble-metal overcoated silver reflectors are particularly well suited for the inner surface of the pump cavity of a laser. To achieve efficient laser operation, it is important to maximize the reflectivity of the pump cavity surface. However, during laser operation, the surface must withstand temperatures as high as about 300° C. In addition, the surface must not react with or be degraded by gases, such as ozone and sulfides generated in the pump cavity, or by coolant fluid, which may be water, ethylene glycol, alcohol, or other coolant fluids.

Figure 2:
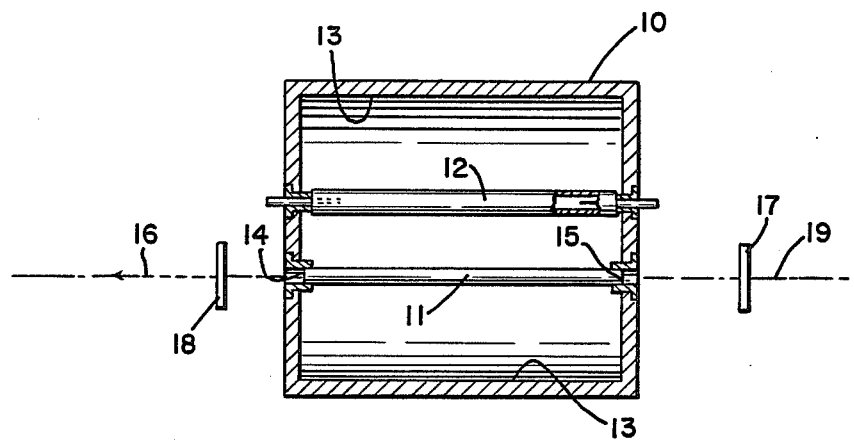
FIG. 2 is an illustration in partial cross section of a typical laser apparatus.

FIG. 2 depicts the construction of a typical prior art laser apparatus. Laser host 11 and pumping source 12 are housed in container 10, which has a highly reflective inner surface 13 and which defines an elliptical cavity. Laser host 11 is provided with coated ends 14 and 15 having a conventional dielectric anti-reflection coating. Completely reflecting mirror 17 and partially reflecting mirror 18 are positioned external to container 10 about cylindrical axis 19 of laser host 11. Lasing action is evidenced by emission of coherent radiation, shown as arrow 16, which emanates from partially reflecting mirror 18.

A pump cavity coating of reflective silver, overcoated with a noble metal, finds particular advantages for a laser whose laser medium is alexandrite (Cr$^{3+}$-doped beryllium alluminate). Alexandrite lasers have been described in U.S. Pat. Nos. Re. 31,057 and 4,272,733. They operate most efficiently when they are pumped at wavelengths between about 350 nm and 700 nm, where alexandrite exhibits strong absorption. Longer (infrared) wavelengths are not strongly absorbed, and shorter (ultraviolet) wavelengths can cause solarization. Suitable lamps for pumping alexandrite include gaseous discharge lamps filled with xenon and/or krypton, and designed to operate either cw or pulsed, and metallic vapor sources such as mercury, sodium, cesium, rubidium and/or potassium.

The pump cavity reflector is preferably silver, prepared by polishing a silver surface or by depositing silver onto a suitable surface; for example, copper, brass, or stainless steel, optionally nickel-plated. Detailed descriptions of the preparation and properties of reflective silver coatings have been published (see, e.g., G. Hass, in *Applied Optics and Optical Engineering*, R. Kingslake, ed. (Academic, New York, 1965), Vol III, pp 309–330). A silver coating provides the highest reflectance in the visible wavelength range, which, as was discussed above, is of primary interest for alexandrite.

However, a bare silver coating is quickly tarnished and loses much of its reflectivity.

Dielectric overcoats of the type known in the art can protect the silver from tarnishing, but they are unable to withstand the high temperatures and/or gases and coolant fluids to which the pump cavity surface is exposed during laser operation. For example, reflectivity-reducing deposits that emanate from solder used in fabricating coolant flow tubes are particularly troublesome, because they cannot be removed without damaging the reflective surface. In addition, the reflectivity of dielectric-overcoated reflectors varies with wavelength and angle of incidence, which is undesirable for a pump cavity reflector.

Better protection is provided to the silver by overcoating it with a thin layer of noble metal, preferably gold. A variety of gold electroplating baths have been developed for various plating applications, including acid- and neutral-cyanide baths, as well as neutral- and alkaline-non-cyanide baths. A number of these baths can provide the excellent corrosion and temperature resistance, with a minimum absorption of incident pump radiation, required for the reflective surface of a laser pump cavity. Suitable baths include Sel-Rex ® BDT ® 510 and BDT ® 200 alkaline, non-cyanide baths.

Not only the plating composition, but also the plating parameters, play an important role in determining the physical properties of the resultant deposit. Thus, solution pH and temperature and cathode current density must be controlled in order to achieve an optimum deposit. Guides for determining optimum bath compositions and parameters for a particular application have been published (see, e.g., A. J. Foster, "A Practical Approach to Gold Electroplating," Electroplating and Metal Finishing, January, 1974, pp. 17–23; February, 1974, pp 22–27). Additional information is available from gold bath suppliers. With the aid of such readily-available information, routine experimentation can be used to determine the overcoat parameters that yield the best results for a specific application.

Optimum overcoat thickness is generally the minimum thickness that protects the silver adequately. Overcoats can be made thick enough to provide such protection but thin enough to absorb little visible light. Thicker coatings reduce the fraction of incident light reflected, which is, of course, undesirable. Moreover, to the extent that thicker overcoatings absorb more of the incident radiation, they become hotter and more prone to degradation. Once optimum parameters are determined, the color of the resultant overcoated reflector can be used as an indicator of the desired overcoat thickness. Typically, an optimally overcoated reflector is about 10 nm to 100 nm thick and has the appearance of white gold.

As discussed above, annealing enhances alloying and, consequently, the adhesion of the noble-metal overcoat. Annealing also enhances reflectivity. If the reflector is on the inner surface of a laser pump cavity, the heat generated by the pump lamp(s) during normal laser operation accomplishes the annealing, typically after about 50,000 pulses of about 100 J each. Thus, the silver coating and noble-metal overcoat needn't be annealed prior to fabrication of the laser.

If the reflector is not on a laser pump cavity, oven annealing that is equivalent to the annealing provided by heat from the pump lamps may be used. Optimum annealing depends on the proper combination of time and temperature, with longer annealing times required for lower temperatures. Annealing times are preferably at least about 1 hour and temperatures should be about 300° C. to about 700° C. Once annealing has been accomplished, additional exposure to elevated temperatures is permissible, provided that temperatures do not exceed about 700° C.

The following examples are presented in order to provide a more complete understanding of the invention. The specific materials and conditions set forth to illustrate the principles and practice of the invention are exemplary and should not be construed as limiting the scope of the invention.

EXAMPLE 1

A gold-overcoated, front-surface silver reflector of the present invention is prepared by the following process:

(1) Polish and pretreat a silver-coated front-surface reflector (pump cavity wall).

(2) Electroplate gold onto the silver from an alkaline, non-cyanide solution composition (such as Sel-Rex ® BDT ® 510.) until the deposit shows the yellowish color characteristic of "white gold." Thickness can be measured using ellipsometry or ion-milling.

(3) To enhance adhesion and reflectivity, anneal the deposit by assembling the pump cavity and exposing the wall to 50,000 pulses from two xenon flashlamps, each emitting 100 J per pulse.

The resulting pump cavity surface withstands over $10^7$ pulses without degradation and can be cleaned readily with an ammonia-based soap (such as MICRO, mfd. by International Products Corp., Trenton, N.J.). Prior art (bare silver) reflectors degraded after about $10^6$ pulses and could not readily be cleaned.

EXAMPLE 2

The process of Example 1 is repeated, except that in step (2) an acid cyanide bath is used. Bath temperature is maintained at 80° C., pH in the range 4–5.5, and cathode current density about 2 ASF. Plating is continued until the proper "white gold" appearance is achieved, typically about 1–10 s.

I claim:

1. In a reflector that includes a substrate having a reflective-silver coating on its front surface, the improvement comprising a partially-transparent gold overcoat on the coating.

2. The reflector of claim 1, in which the overcoat has a thickness in the range between about 1 nm and about 1,000 nm.

3. A process for preparing the reflector of claim 1 comprising the step of vacuum-depositing gold onto a front-surface reflective-silver coating.

4. The process of claim 3 comprising the further step of annealing the coating and overcoat at a temperature of at least about 300° C. for at least about one hour.

5. A process for preparing the reflector of claim 1 comprising the step of electrodepositing gold onto a front-surface relfective-silver coating.

6. The process of claim 5 comprising the further step of annealing the coating and overcoating at a temperature of at least about 300° C. for at least about one hour.

7. In a laser that includes a laser medium, pump means for exciting the laser medium to emit coherent radiation, and a pump cavity to enclose the laser medium and pump means, the improvement comprising an inner surface of said pump cavity having a reflective-silver coating and a partially-transparent gold overcoat.

8. The laser of claim 7 in which the laser medium comprises alexandrite.

* * * * *